United States Patent
Gopalakrishnan et al.

(10) Patent No.: US 11,586,889 B1
(45) Date of Patent: Feb. 21, 2023

(54) SENSORY PERCEPTION ACCELERATOR

(71) Applicant: Amazon Technologies, Inc., Seattle, WA (US)

(72) Inventors: Varadarajan Gopalakrishnan, Cupertino, CA (US); Adam Fineberg, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 562 days.

(21) Appl. No.: 16/713,854

(22) Filed: Dec. 13, 2019

(51) Int. Cl.
| | |
|---|---|
| *G06N 3/063* | (2006.01) |
| *G06F 9/50* | (2006.01) |
| *G06F 7/523* | (2006.01) |
| *G10L 15/16* | (2006.01) |
| *G06F 17/16* | (2006.01) |
| *G06F 7/50* | (2006.01) |
| *G06V 20/64* | (2022.01) |
| *G06V 40/10* | (2022.01) |

(52) U.S. Cl.
CPC .............. *G06N 3/063* (2013.01); *G06F 7/50* (2013.01); *G06F 7/523* (2013.01); *G06F 9/5027* (2013.01); *G06F 17/16* (2013.01); *G06V 20/64* (2022.01); *G06V 40/10* (2022.01); *G10L 15/16* (2013.01)

(58) Field of Classification Search
CPC ........... G06N 3/063; G06F 7/50; G06F 7/523; G06F 9/5027; G06F 17/16; G06V 20/64; G06V 40/10; G10L 15/16
See application file for complete search history.

(56) References Cited

U.S. PATENT DOCUMENTS

| | | | | |
|---|---|---|---|---|
| 4,800,519 | A * | 1/1989 | Grinberg | G06E 3/005 |
| | | | | 708/835 |
| 9,112,743 | B1 * | 8/2015 | Shirakawa | H04B 1/123 |
| 10,546,481 | B2 * | 1/2020 | Kusens | G08B 21/0423 |
| 11,108,795 | B2 * | 8/2021 | Lee | G06F 21/566 |
| 11,275,661 | B1 * | 3/2022 | Vantrease | G06N 3/063 |
| 2009/0222518 | A1 * | 9/2009 | Chang | H04L 12/1818 |
| | | | | 709/204 |
| 2010/0197262 | A1 * | 8/2010 | Hosokawa | H04B 7/0865 |
| | | | | 455/234.1 |
| 2014/0205082 | A1 * | 7/2014 | Nuzman | H04B 3/32 |
| | | | | 379/406.06 |
| 2016/0342892 | A1 * | 11/2016 | Ross | G06N 3/063 |
| 2017/0285732 | A1 * | 10/2017 | Daly | A61B 5/0205 |
| 2018/0157465 | A1 * | 6/2018 | Bittner | G06F 7/52 |
| 2019/0087712 | A1 * | 3/2019 | Sundaresan | G06N 3/0454 |

(Continued)

OTHER PUBLICATIONS

Montagnuolo, M., et al., "Parallel neural networks for multimodal video genre classification", Multimed Tools Appl (2009) 41:125-159, DOI 10.1007/s11042-008-0222-3.*

*Primary Examiner* — Xuemei G Chen
(74) *Attorney, Agent, or Firm* — Kilpatrick Townsend & Stockton LLP

(57) ABSTRACT

To reduce the reliance on software for complex computations used in machine sensory perception, a sensory perception accelerator may include a neural network accelerator a linear algebra accelerator. The neural network accelerator may include systolic arrays to perform neural network computation circuits concurrently on image data and audio data. The linear algebra accelerator may include matrix computation circuits operable to perform matrix operations on image data and motion data.

18 Claims, 9 Drawing Sheets

(56) References Cited

U.S. PATENT DOCUMENTS

| | | | |
|---|---|---|---|
| 2019/0114535 A1* | 4/2019 | Ng | G06N 3/0454 |
| 2019/0222756 A1* | 7/2019 | Moloney | H04N 5/23245 |
| 2019/0294999 A1* | 9/2019 | Guttmann | G06K 9/6257 |
| 2020/0026747 A1* | 1/2020 | Cheng | G06F 17/16 |
| 2020/0089967 A1* | 3/2020 | Velipasalar | G06T 3/4046 |
| 2020/0104670 A1* | 4/2020 | Seo | G06N 3/084 |
| 2020/0159812 A1* | 5/2020 | Zarar | G06F 7/5443 |
| 2020/0226201 A1* | 7/2020 | Ma | G06N 3/063 |
| 2020/0250032 A1* | 8/2020 | Goyal | H03M 13/373 |
| 2020/0349216 A1* | 11/2020 | Das Sarma | G06N 3/063 |
| 2020/0357143 A1* | 11/2020 | Chiu | G06T 7/97 |
| 2021/0142059 A1* | 5/2021 | Lee | G06K 9/6262 |
| 2021/0366506 A1* | 11/2021 | Han | G06N 20/10 |
| 2022/0053282 A1* | 2/2022 | De Bruijn | H04S 7/304 |

\* cited by examiner

SENSORY PERCEPTION ACCELERATOR

BACKGROUND

Machine sensory perception relates to the capability of a device to interpret information on the device's surroundings in a manner that is similar to the way humans use their senses to relate to the world around them. Machine sensory perception allows a device to behave autonomously and react to the device's environment. For example, machine sensory perception may allow a device to autonomously navigate around obstacles and avoid moving objects that may come into the path of the device.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Machine sensory perception can be implemented by using software executing on a general purpose processor to perform complex computations to analyze a device's surroundings. However, such an approach may require a high performance general purpose processor to be able to handle the extensive computational demands of machine sensory perception. While such an approach may be acceptable for applications in which the device has a constant power source to power the high performance processor and sufficient cooling mechanism to dissipate heat from the processor, such an approach can be detrimental to the battery life and thermal tolerance of portable battery-powered devices. Furthermore, in autonomous mobility applications, such an approach can impose a limit on the responsiveness and speed at which a device can move around in its surroundings due to the latency involved with using software to perform complex computations for machine sensory perception.

To reduce the reliance on software for complex computations, the techniques described herein utilize specialized local hardware tailored for computations involved in machine sensory perception. As compared to software implementations, the specialized local hardware allows for faster off-line processing of sensor data, and provides a device with a more complete awareness of the device's surroundings. For example, visual data captured by a camera of the device can be processed locally to detect and recognize people, objects, and pets; audio data captured by a microphone of the device can be processed locally to detect acoustic events and recognize words or phrase as commands to control the device; motion data captured by inertial sensors can be processed locally in conjunction with visual data to recognize walls and doorways to provide simultaneous localization and mapping information to create a global map of the device's surroundings for autonomous navigation; etc. While some devices may have the capabilities to perform some of these functions individually in software, the specialized hardware described herein makes it possible for a device to perform these functions simultaneously in combination, while preserving battery life and yielding tolerable heat dissipation by reducing the reliance on computational intensive software.

Figure 1:
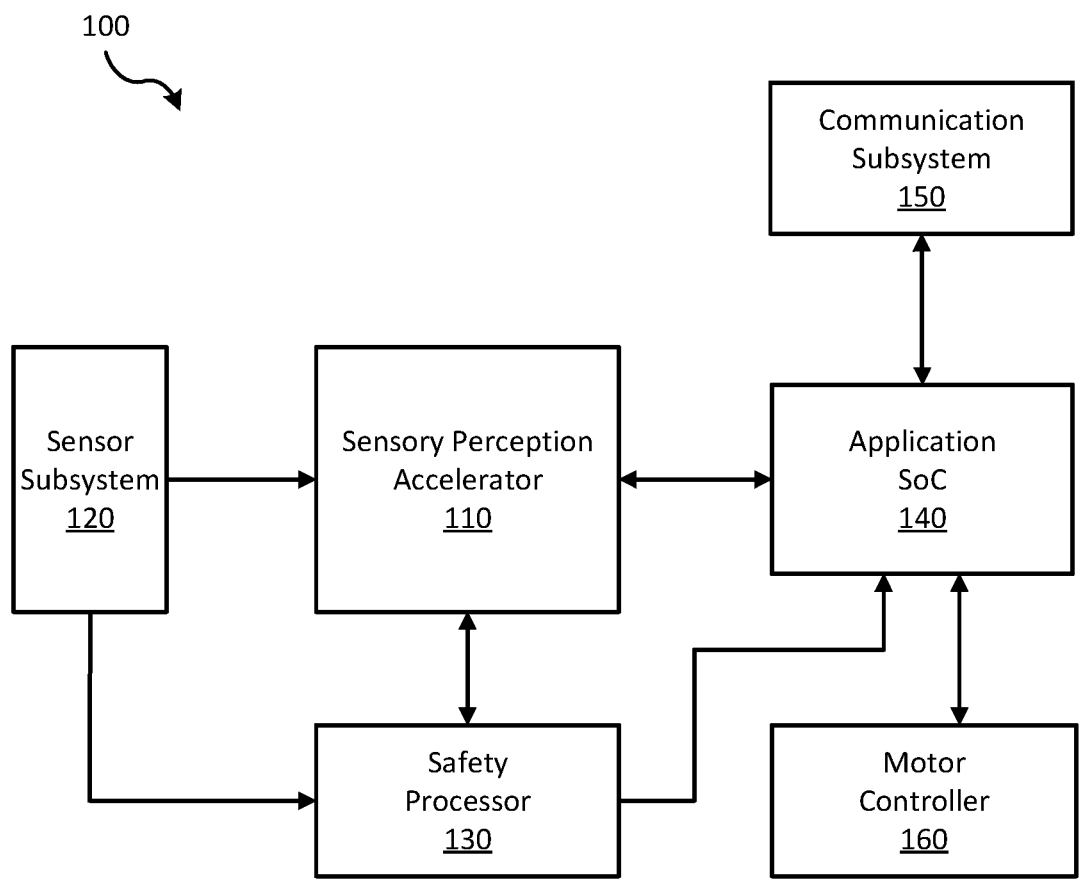
FIG. 1 illustrates a block diagram of an example of a system that utilizes specialized hardware to provide environmental awareness for a device.

FIG. 1 illustrates a block diagram of an example of a system 100 that utilizes specialized hardware in the form of a sensory perception accelerator 110 to provide environmental awareness for a device. System 100 can be integrated, for example, in an autonomous mobility device such as an autonomous robot, augmented and/or virtual reality devices including portable or wearable devices, autonomous vehicles such as drones or delivery vehicles, or other electronic or data processing devices that can benefit from environmental awareness, etc.

System 100 may include sensor subsystem 120, sensory perception accelerator 110, safety processor 130, application system on a chip (SoC) 140, communication subsystem 150, and motor controller 160. Sensor subsystem 120 may include one or more sensors to observe the surroundings of system 100. For example, sensor subsystem 120 may include one or more cameras to capture images and/or video, one or more microphones to capture mono or stereo audio, and/or one or more motion sensors to capture motion information. Examples of the types of cameras used in sensor subsystem 120 may include color cameras such as red green blue (RGB) cameras, infrared (IR) cameras, near infrared (NIR) cameras, etc. Examples of the types of motion sensors used in sensor subsystem 120 that include inertial measurement units (IMUs) (e.g., accelerometers, gyroscopes, magnetometers, etc.), motor sensors (e.g., wheel sensors, rotary blade sensors, stride sensors, etc.), and/or other auxiliary sensors (e.g., radar sensors, ultrasonic sensors, time-of-flight sensors, satellite positioning sensors, etc.).

Sensory perception accelerator 110 may include sensor engine circuitry tailored for analysis of the sensor data from sensor subsystem 120 to provide system 100 with environment awareness. The circuitry in sensory perception accelerator 110 may include sensor engine circuitry to perform preprocessing of the raw sensor data from sensor subsystem 120. The sensor engine circuitry may receive the raw sensor data from sensor subsystem 120, and convert the sensor data into audio data, image data, and motion data suitable for downstream processing. The sensor engine circuitry can be implemented, for example, using include one or more processors and/or one or more signal processors (e.g., image signal processor, audio signal processor, motion processor, etc.).

Sensory perception accelerator 110 may also include neural engine circuitry to execute neural networks on different types of input data for machine learning and run inference workloads. For example, the neural engine circuitry may receive image and audio data from the sensor engine circuitry, and perform visual and audio detection and recognition based on the image data and the audio data, respectively.

Sensory perception accelerator 110 may further include a position and mapping engine having linear algebra circuitry to perform matrix computations on different types of input data. The linear algebra circuitry may receive image and motion data from the sensor engine circuitry, and generate position and mapping information based on the image and motion data by performing matrix operations using specialized matrix computation circuits. In some implementations, the neural engine circuitry and the linear algebra circuit may operate on the same type of input data simultaneously. For example, neural engine circuitry and the linear algebra circuit may operate on the same image data concurrently Utilization of sensory perception accelerator 110 may allow a device incorporating system 100 to perform functions such as off-line speech recognition for virtual assistant; detection and recognition of common household objects, personal objects, and pets; recognition of gestures; recognition of walls, doors, and doorways to make decisions on optimal paths; etc. In some implementations, sensory perception accelerator 110 may provide system 100 with the ability to recognize the state of a user in a semantically meaningful way to detect and respond to auditory and visual cues, gestures, and emotions in a social environment to interact with humans and pets. Additional details of sensory perception accelerator 110 will be described further below.

Application SoC 140 may include hardware components such as a processor or controller and software to manage the mobility of the device incorporating system 100. Application SoC 140 may receive position and mapping information from sensory perception accelerator 110 to locate the device in its environment, and to dynamically plan a path to navigate. Application SoC 140 may also receive alert information from safety processor 130, for example, to prevent the device from colliding with other objects that may obstruct the path of the device. Application SoC 140 may use the information from sensory perception accelerator 110 and safety processor 130 to instruct motor controller 160 on the speed and direction of the device. Application SoC 140 may also run software that is specific to the particular application of system 100. For example, system 100 can be incorporated into a household cleaning robot, and application SoC 140 may manage the cleaning cycles performed by the robot. As another example, system 100 can be incorporated into an autonomous delivery vehicle, and application SoC 140 may schedule deliveries for the vehicle, and control access to compartments storing the items for delivery.

Safety processor 130 may generate alerts for system 100 based on environmental information received from sensory perception accelerator 110. For example, safety processor 130 may generate an alert when an object suddenly moves into the path of the device incorporating system 100, or when the device is moving close to the top of a stairway. Safety processor 130 may also generate alerts based on other system status such as a low battery alert. Application SoC 140 may take corrective actions based on the alerts from safety processor 130 such as halting the device, reversing course, directing the device back to a charging station, etc.

Motor controller 160 may control the motor and moving components of the device incorporating system 100 based on instructions from application SoC 140. For example, motor controller 160 may control the wheel speed of the wheels of the device, or rotary blade speed of the propellers of the device to adjust the speed of the device; motor controller 160 may control the tilt of the wheels, or pitch and yaw of propellers to change the directional heading of the device; etc.

Communication subsystem 150 may include one or more transceivers to provide system 100 with wireless communications capabilities. Communications subsystem 150 may support cellular, WiFi, Bluetooth, Zigbee, or other suitable communication protocols. Communication subsystem 150 can be used to communicate with an external system, for example, with a remote server to perform data backup, receive system updates, and/or access the Internet, etc. Communication subsystem 150 may also allow the device to communicate with other devices, for example, to form a smart home system, or to coordinated a system of robots, etc.

Figure 2:
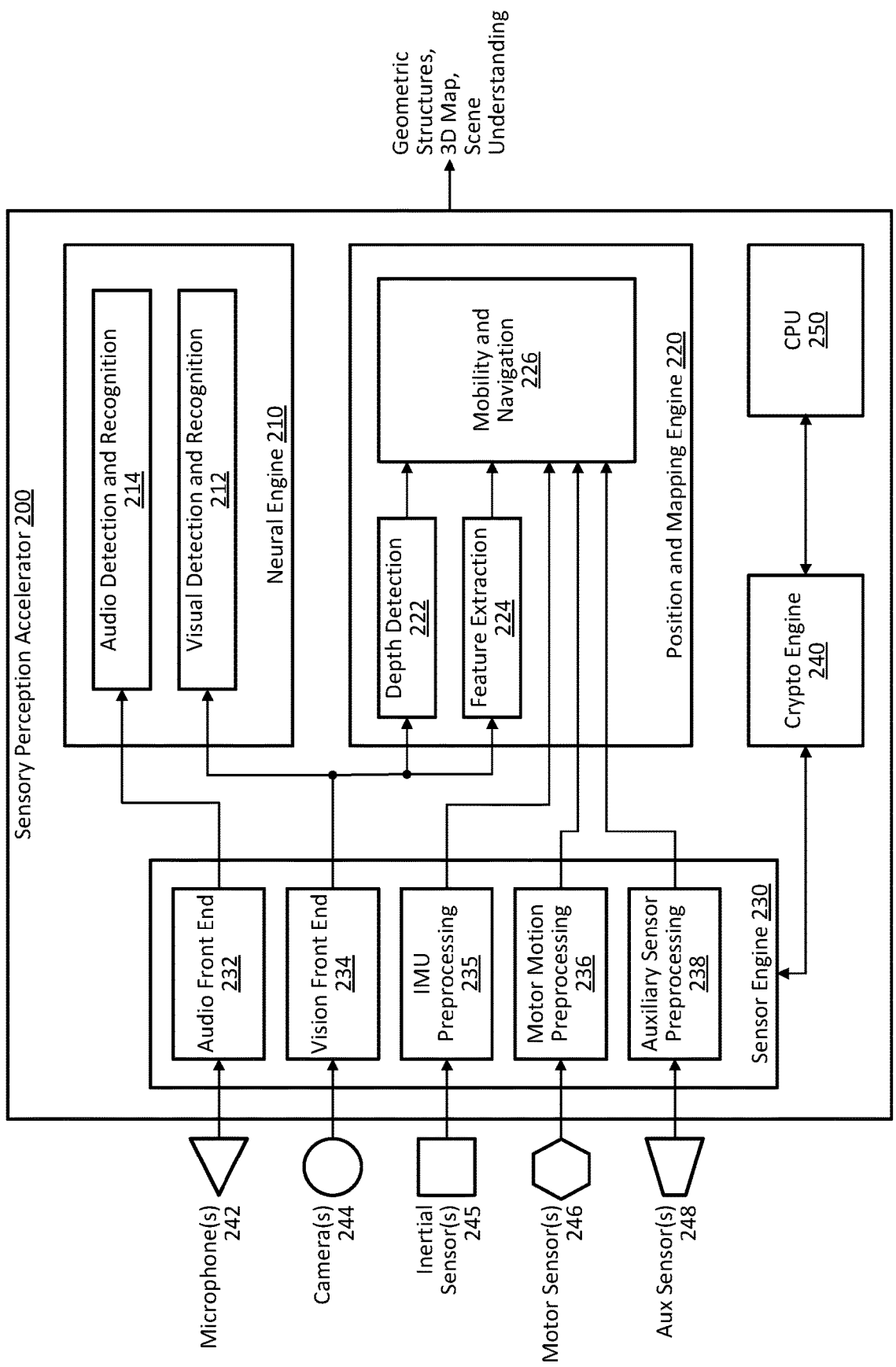
FIG. 2 illustrates a functional block diagram of an example of a sensory perception accelerator.

FIG. 2 illustrates a functional block diagram of an example of a sensory perception accelerator 200. Sensory perception accelerator 200 may include circuitry implementing a neural engine 210, position and mapping engine 220, and sensor engine 230. Sensor engine 230 is coupled to one or more sensors to receive and perform preprocessing of the sensor data provided by the one or more sensors. The types of sensors that can be used may include one or more of microphones 242, cameras 244, and motion sensors such as inertial sensors 245, motors sensors 246, and auxiliary sensors 248. Although FIG. 2 illustrates various types of sensors, it should be noted that some implementations may omit certain sensors, and other implementations may include sensors that are not specifically shown.

Sensor engine 230 may include an audio front end 232 to preprocess raw sound captured by one or more microphones 242. Audio front end 232 may store the captured sound in a sound or speech buffer, and perform digital signal processing and fast Fourier transform to obtain a spectral analysis of the captured sound. The spectral analysis can be used to perform acoustic echo cancellation and active noise reduction of the captured sound to remove any acoustic feedback and background noises to provide clean audio data to neural engine 210 for further processing.

Sensor engine 230 may further include a vision front end 234 to preprocess raw image stream captured by one or more cameras 244. Vision front end 234 may store the captured image stream in a line/tile buffer, and may include an image signal processor to perform statistical analysis of the image stream to refine the captured images. The image signal processor may perform demosaic processing to reconstruct full color images, noise reduction, dewarping to flatten the image, defective pixel correction, back light compensation to improve contrast, and lens shading correction to improve uniformity of illumination and color, etc. to provide clean image data to neural engine 210 and position and mapping engine 220 for further processing.

Sensor engine 230 may also include various preprocessing units to clean up and perform basic analysis of the raw sensor signals. For example, IMU preprocessing 235 may performed integration of inertial sensor measurements, compensate for sensor bias, and provide motion data such as velocity, acceleration, heading, pitch, yaw, and roll information, etc. to position and mapping engine 220 for further processing. Similarly, motor motion preprocessing 236 and auxiliary sensor preprocessing 238 may provide integration and signal clean-up of the raw sensor data to provide information such as distance traveled, proximity to other objects, and/or other motion related data to position and mapping engine 220 for further processing.

Neural engine 210 can be implemented as a neural network accelerator for neural network layer and non-linear activation functions. Neural engine 210 allows for low-latency switching of multiple sequential neural networks and allows for multiple simultaneous neural networks to be running inference. Neural engine 210 is tailored for deep neural network computations. This may include convolutional, recurrent and fully connected multi-layer perceptron layers. Neural engine 210 is capable of performing audio detection and recognition 214 to provide acoustic event notifications and automatic speech recognition information, etc. Neural engine 210 is also capable of performing visual detection and recognition 212 to provide detection results and confidence of the results. Audio detection and recognition 214 and visual detection and recognition 212 can be performed simultaneously, and vision and speech data can each be processed through multiple parallel networks. For example, a human detector network can run in parallel to a face recognition network. Similarly, an acoustic event detection network can run in parallel to wake-word detection and speech recognition networks. The audio and visual detection and recognition can provide the system with environmental awareness of the sights and sounds in the device's surrounding environment.

Position and mapping engine 220 may include a linear algebra accelerator for matrix and vector operation acceleration. Linear algebra operations form the basis for most of the mobility, mapping and computational photography algorithms, and thus linear algebra accelerator can be used to speed up such image and mobility processing. Position and mapping engine 220 may perform functions such as depth detection 222, feature extraction and comparison 224, and other mobility and navigation functions 226 such as point-cloud to 3D geometrical primitive representation, simultaneous localization and mapping (SLAM), 3D mapping, coordinate transformation, etc. Position and mapping engine 220 may include linear algebra circuitry that is capable of accommodating different matrix sizes and performing multiple matrix operations in parallel. Position and mapping engine 220 may generate a global 3D map including geometric structures in the device's surroundings with obstacle locations and path travelled information, and provide the device with scene understanding.

Sensory perception accelerator 200 may include a processor complex 250 to orchestrate the data flow between the various engines and to maximize the occupancy of the hardware accelerators. Processor complex 250 may also perform path planning and other higher level visual perception operations that are less computational intensive. In some implementations, sensory perception accelerator 200 may also include a crypto engine 240 executing in a trusted execution environment to encrypt the sensor data and/or datapaths for data protection.

Figure 3:
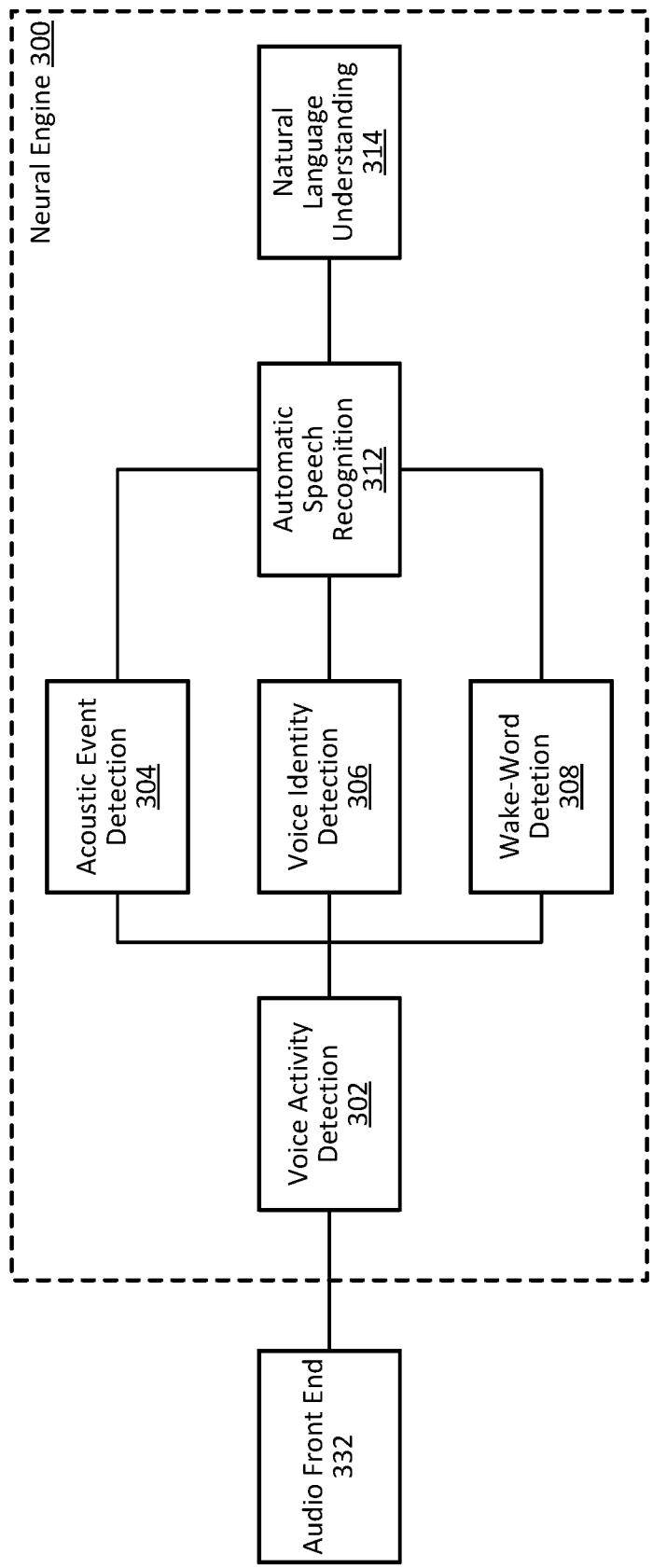
FIG. 3 illustrates a functional block diagram of an example of a neural network topology that can be executed in a neural engine.

FIG. 3 illustrates a functional block diagram of an example of a neural network topology that can be executed in neural engine 300. The neural networks shown in FIG. 3 can be part of the audio detection and recognition functions of sensory perception accelerator by running inference on audio data provided by audio front end 332.

In some implementations, the audio data from audio front end 332 may first be processed by a voice activity detection network 302. Voice activity detection network 302 can be used to distinguish between human voice and background or ambient sounds. The detection of a human voice may indicate that a user is speaking to the device, and such an event may activate other neural networks to further analyze the speech of the user.

Once a voice activity has been detected, a wake-word detection network 308 can be executed to recognize a work or phrase that the speech of the user is being directed at the device. For example, the device can be given a name, and that name can be used as a wake-word. Recognition of a user saying that name indicates that the user is indeed speaking to the device and not to other humans or devices.

Along with wake-word detection network 308, a voice identity detection network 306 can be executed simultaneously to identify who the user is. The identity of the user can be used to perform authentication functions. For example, the device can be programmed to only respond to certain users while ignoring commands from other users. The identity of the user can also be used to retrieve the proper speech recognition model to account for variations in languages and voices of different users to improve performance of downstream networks such as automatic speech recognition network 312.

An acoustic event detection network 304 can also be executed simultaneously to detect acoustic events produced by a user or objects handled by the user. The identity of such sounds and their position in time may help to detect and describe certain human activities. For example, clapping or laughing during speech, a strong yawn in the middle of speech, or a chair moving or door closing during speech can be useful to enhance the robustness of automatic speech recognition network 312.

Automatic speech recognition network 312 can be activated when a valid wake-word is detected by wake-word detection network 308, and may select a voice model based on the results of voice identify detected network 306. Automatic speech recognition network 312 can analyze the audio data to recognize words and phrases spoken by the user. Automatic speech recognition network 312 may use the results of acoustic event detection network 304 to give context to the words and phrases to reduce errors and improve performance.

The words and phrases detected by automatic speech recognition network 312 can then be processed by natural language understanding network 314 to interpret the speech of the user. The results of the natural language understanding network 314 can be used to determine a proper response, if any, from the device. For example, if the speech is understood to be a command to control the device, the device may react by performing the command, or if the speech is a query for information, the device may respond to the query with an answer.

Figure 4:
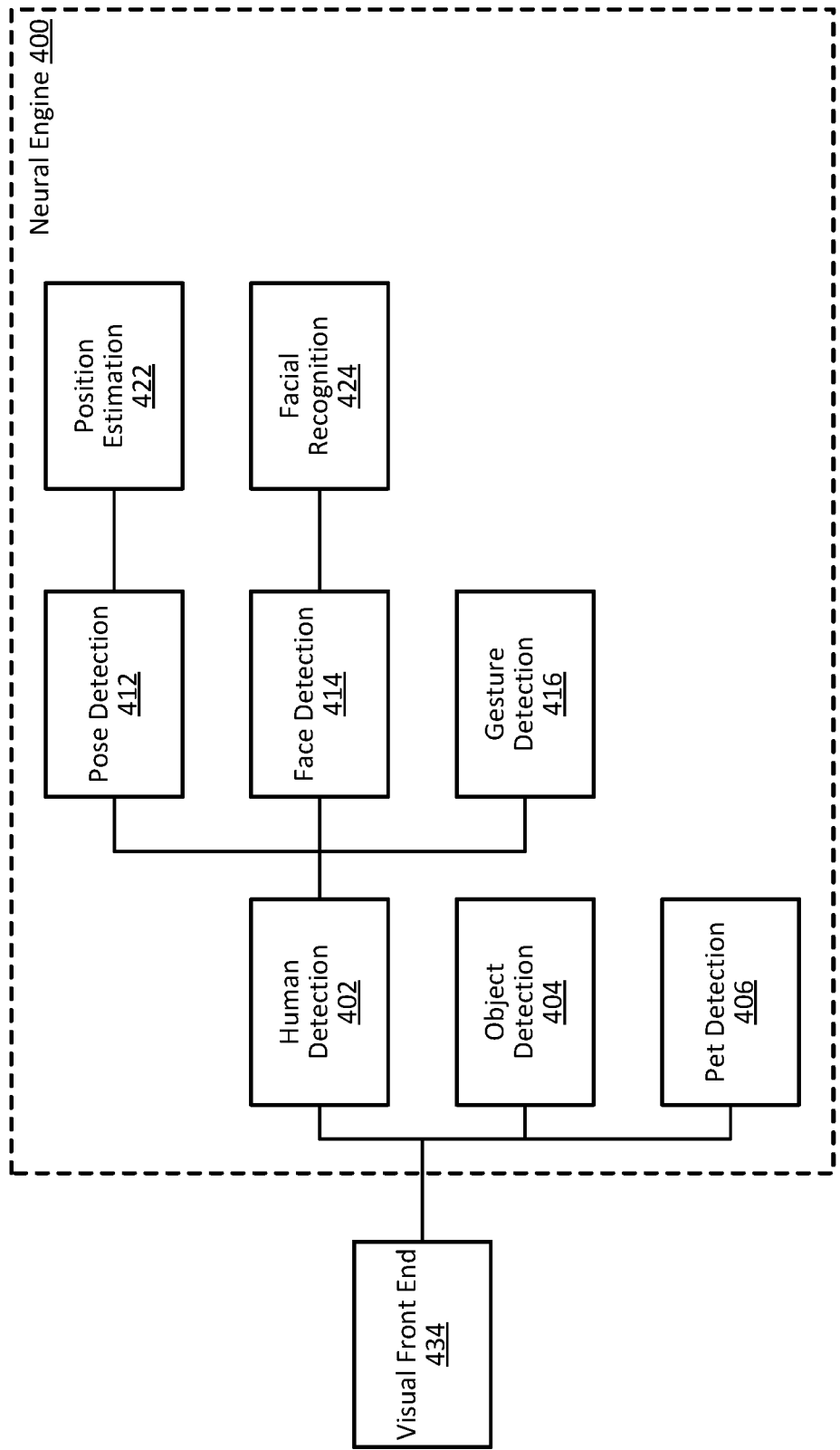
FIG. 4 illustrates a functional block diagram of another example of a neural network topology that can be executed in a neural engine.

FIG. 4 illustrates a functional block diagram of another example of a neural network topology that can be executed in neural engine 400. The neural networks shown in FIG. 4 can be part of the visual detection and recognition functions of a sensory perception accelerator by running inference on image data provided by vision front end 434. It should be understood that the neural networks shown in FIG. 4 can be executed simultaneously with the neural networks shown in FIG. 3.

In some implementations, the image data from vision front end 434 may be processed simultaneously by a human detection network 402, an object detection network 404, and a pet detection network 406. Human detection network 402 can analyze the image data to determine if any human is present in the surroundings of the device. Human detection network 402 may detect human features such as heads, arms, and legs, and human postures in an image to infer whether such features correspond to a human. Similarly, pet detection network 406 can analyze the image data to determine if any pet or animal (e.g., cats, dogs, etc.) is present in the surroundings of the device based on detection of animal features. Object detection network 404 can analyze the image data to determine if certain objects of relevance are present in the surroundings of the device. For example, objects that may be relevant to a household robot may include chairs, tables, doors, walls, items that the robot may pick up, etc. Multiple instances of object detection network 404 can run models of different objects to determine the presence of such objects.

Once one or more humans have been detected by human detection network 402, a pose detection network 412 can be activated. Pose detection network 412 can be used to determine the posture of a human in the surroundings of the device. For example, pose detection network 412 may determine if a human is sitting, standing, or laying down, etc. The results of pose detection network 412 can be used by a positon estimation network 422 to determine the position and distance of a human related to the device.

A face detection network 414 can also be executed simultaneously with pose detection network 412. Face detection network 414 can be used to distinguish between the face and of a human and the rest of the body. Face detection network 414 can also identify and locate facial features such as eyes, nose, mouth, etc. The results of face detection network 414 can be used by a facial recognition network 424 to identify the human and/or mood of the human.

A gesture detection network 416 can also be run in parallel with pose detection network 412 and dace detection network 414. Gesture detection network 416 can be used to identify gestures from the human, for example, to determine if a user is issuing a command to the device. As with the other neural networks, there can be multiple instances of pose detection network 412, face detection network 414, and gesture detection network 416 running in parallel, including one network of each for every human detected in the surroundings of the device.

Although the examples in FIGS. 3 and 4 have been shown with certain neural networks executing in the neural engine of a sensory perception accelerator, it should be understood that depending on the application of the device, one or more of the neural networks shown can be omitted. Furthermore, in some implements, the neural engine may execute other neural network(s) not specifically shown.

As the examples above illustrate, to provide a device with a more complete environmental awareness, a device may execute numerous neural networks to obtain auditory and visual perception of the device's surroundings, and multiple of the neural networks may be executed in parallel. Some of the neural networks executed in parallel may operate on the same feature map inputs (e.g., pose detection network 412, face detection network 414, and gesture detection network 416 may operate on the same portion of an image identified as showing a human), and some of the neural networks executed in parallel may operate on different feature map inputs (e.g., humane detection network 402 may operate on image data while voice activity neural network 302 may operate on audio data). Furthermore, some detection and recognition functions may run multiple instances of the same neural network. To increase the parallelism and improve data sharing amongst the various neural networks, a sensory perception accelerator may implement a neural engine with an architecture such as that shown in FIG. 5.

Figure 5:
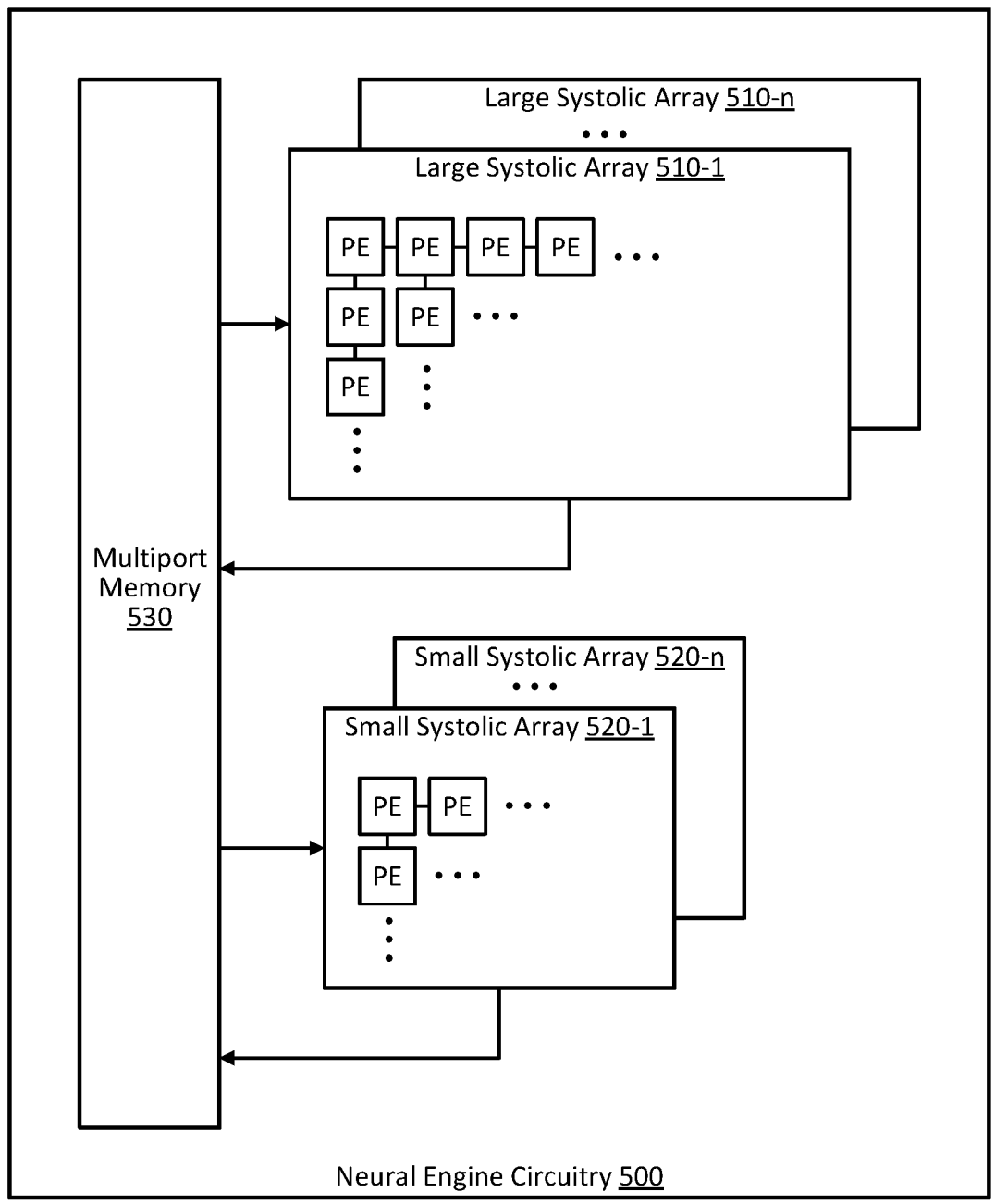
FIG. 5 illustrates a hardware block diagram of an example neural engine that can be implemented in a sensory perception accelerator.

FIG. 5 illustrates a hardware block diagram of an example of neural engine circuitry 500 that can be implemented in a neural engine of a sensory perception accelerator. The neural engine may also be referred to as a neural network accelerator. Neural engine circuitry 500 may include a multiport memory 530 and multiple neural network computation circuits such as systolic arrays that can execute in parallel and independently. As compared to generic processing hardware, neural network computations can be executed in systolic arrays more efficiently due to the structure of the systolic array. In some implementations, neural engine circuitry 500 may also include a local processor (not shown) to manage the data transfer of the neural engine. In some implementations, the neural network computation circuits can be implemented using vector dot product engines instead of systolic arrays, or a combination of both vector dot product engines and systolic arrays.

A systolic array can execute parallel integration, convolution, correlation, and/or matrix multiplication, among other things. A systolic array may include multiple processing elements (PEs), arranged in rows and columns, such that results output by one processing element can be input directly into another processing element. Processing elements that are not on the outside edges of the processing engine array thus can receive data to operate on from other processing elements, rather than from multiport memory 530. Data may arrive at each processing element from different directions at regular intervals. For example, weights and input data (e.g., feature map inputs representing data under analysis) can flow from the left, and partial sums for accumulation can flow from top to bottom. The feature map inputs may represent, for example, a portion of an image under analysis, or a snippet of audio under analysis, etc. A multiply-and-accumulate operation can move through the array as a diagonal wave front, with data moving to the right and down across the array. Control signals can be input at the left at the same time as weights, and can flow across and down along with the computation.

Each processing element can include a multiplier-accumulator circuitry. Inputs from the left can include, for example, input data and a weight value, where the input data can be a feature map (FMAP) value taken from either a set of input data or a set of intermediate results, and the weight value is from a set of weight values that connect one layer of the neural network to the next. A set of input data can be, for example, an image data being submitted for identification or object recognition, or audio data being provided for speech recognition, etc. The input data and the weight value are output to the right, for input to the next processing element.

An input from above can include a partial sum provided either from another processing element or from a previous round of computation by the systolic. When starting a computation for a new set of input data, the top row of the systolic array may receive a fixed value such as zero. The input value and the weight value are multiplied together and the result is summed with partial sum input in the processing element to produce a new partial sum output, which can be input into another processing element. Outputs from the last row in the systolic array can be temporarily stored in multiport memory 530. The last row outputs can be intermediate results (e.g., partial sums), in which case, the results are written into multiport memory 530 to be provided to the systolic array for additional computation. When the last row outputs are the final results, the results can be written into the memory to be read out from the neural engine.

The number of columns in the systolic array can determine the computational capacity of the array, and the number of rows can determine the required memory bandwidth for achieving maximum utilization of the array. Larger neural networks (e.g., having a larger weight matrix) can run more efficiently on a systolic array that can accommodate the weight matrix, because the weight values only need to be loaded into the array once to complete one round of computations. Otherwise, computations on the same set of feature map has to be repeated for each portion of the weight matrix that can be fitted into the array. Executing a small neural network in a larger systolic array can also cause inefficiencies because wasted cycles may be required to shift values of completed computations out of the array.

Accordingly, the systolic arrays in the neural engine may include systolic arrays of different sizes. For example, neural engine circuitry 500 may include one or more systolic arrays of a first size to perform computations on a weight matrix of the first size, and one or more systolic arrays of a second size to perform computations on a weight matrix of the second size. The example shown in FIG. 5 may include any number of large systolic arrays 510-1 to 510-*n* (e.g., 256×128 arrays) and any number of small systolic arrays 520-1 to 520-*n* (e.g., 64×64 arrays). The number of large systolic arrays need not be the same as the number of small systolic arrays. Furthermore, in some implementations, neural engine circuitry 500 may include systolic arrays of three or more different sizes.

By including systolic arrays of different sizes, neural networks can be matched to the proper sized systolic array for improved execution efficiency. Furthermore, by providing systolic arrays, larger neural networks that may not be fitted into a systolic array can be fitted into multiple arrays, and the arrays can be executed in parallel on the same feature map inputs to effectively create a larger array. To provide such data sharing capabilities, multiport memory 530 can be used such that the same data can be selectively outputted to multiple arrays at the same time. This also allows different neural networks running in different systolic arrays to operate on the same feature map inputs. In some implementations, multiport memory 530 can be a tightly coupled memory (TCM) to provide low latency exchange of data between the systolic arrays. It should be understood that the above description of neural engine circuitry 500 may also apply to implementations in which vector dot product calculation engines are used.

Figure 6:
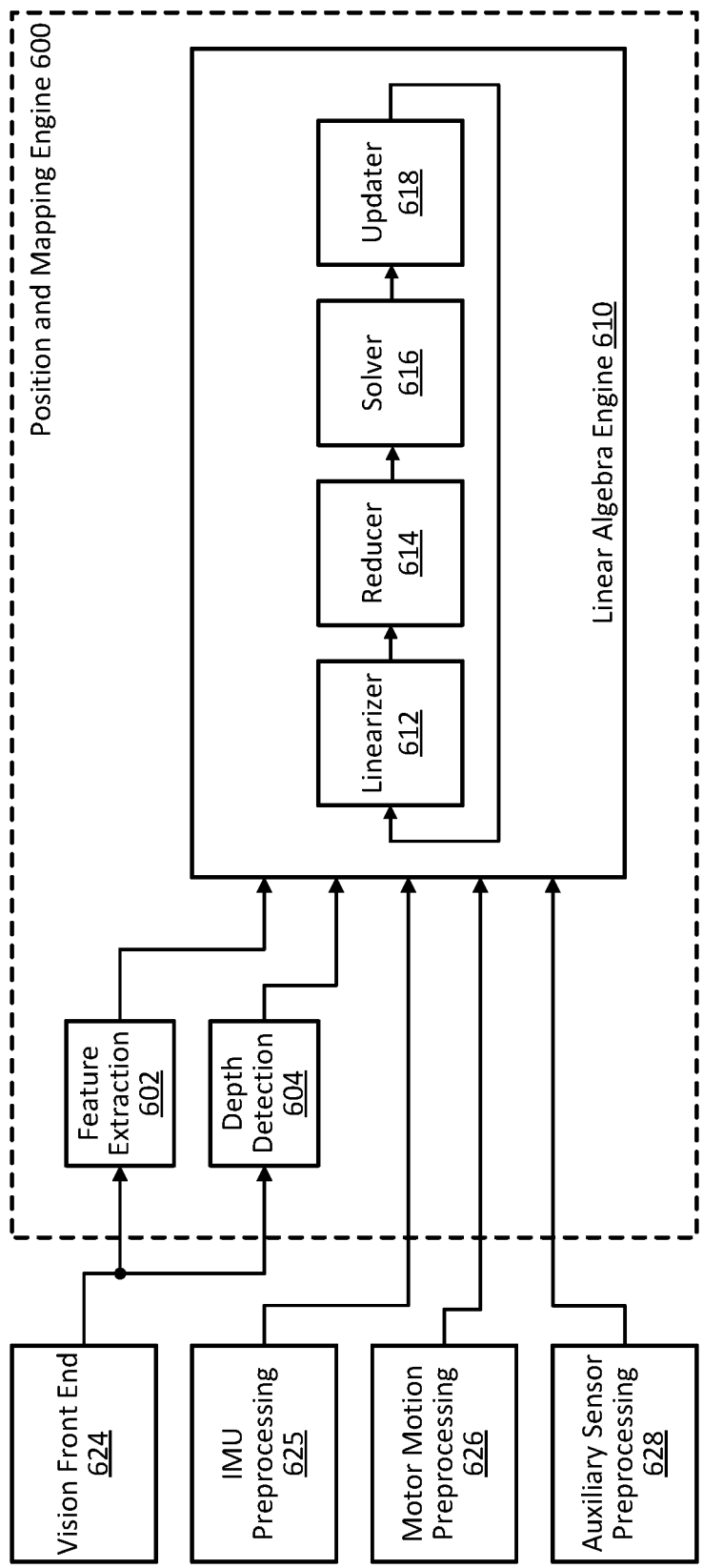
FIG. 6 illustrates a functional block diagram of an example linear algebra engine that can be implemented in a sensory perception accelerator.

FIG. 6 illustrates a functional block diagram of an example position and mapping engine 600. In some implementations, image data from vision front end 624 can be analyzed for feature extraction 602 and depth detection 604. Feature extraction 602 can be used to detect shapes such as corners, edges of walls, and doorways in a device's surroundings. Depth detection 604 can be used to determine distance and spatial dimensions of objects. The results of feature extraction 602 and depth detection 604 can be used to create feature points of the device's environment, which can be used to generate a 3D map of the device's surroundings. The feature points can be fed into a linear algebra engine 610 together with motion data provided from one or more of IMU preprocessing 625, motor motion preprocessing 626, and auxiliary sensor preprocessing 628 such as acceleration, angular velocity, and/or other distance/position measuring information from the sensors.

Linear algebra engine 610 can implement an optimizer take the feature points and motion data as observation values, and provide, based on a model function, estimations of the position, rotation relative to a global reference frame, speed, etc. of the device in a 3D map as the device is moving around. For example, the distance to a corner of a room can be determined from a captured image at a first point in time. As the device moves away from the room corner as indicated by the motion data, that room corner should appear further away by the traveled distance in a captured image at a second point in time. The location of the device can be accurately determined when the error between the estimated position from the model function, and the observed traveled distance as indicated by the motion data and captured images is minimal. While this example provides one feature point (e.g., the room corner), the optimizer can provide estimations based on a model function using numerous feature points in a device's surrounding and various motion data, and simultaneously solve for the minimal error satisfying the set of parameters.

An explanation of the optimizer in mathematical terms can be described as follows. Find x* that minimizes the model function F(x) such that x*=arg min F(x), where x is an n dimensional vector n>1 and F(x) is a scalar. When $$F(x) = \frac{1}{2}\sum_{i=1}^{m} e_i^2(x) \text{ for } m \geq n$$

this becomes a non-linear least squares problem. When $e_i(x)$ are residuals, error between observed values $y_i$ and predicated values from a model $f_i(x)$ then the problem becomes non-linear least squares error minimization. Thus, the lease squares error minimization problem can be formulates as find x* such that it minimizes the function $$F(x) = \frac{1}{2}\sum_{i=1}^{m} [|y_i - f_i(x)|]^2$$

Most methods of non-linear minimization techniques are iterative. This is, from a starting point $x_0$ obtained from the knowledge of the problem at hand and previous known solutions, a series of vectors $x_1, x_2, \ldots$ which converges to x* can be produced. At each iteration, $x_i$ can be updated such that $x_i = x_{i-1} + \Delta x_{i-1}$. The step size $\Delta x_j$ can be computed at each step j. Mathematical tool used in these iterative techniques can use Taylor series expansion of the function F(x), because the first and second derivatives of the function provide significant information on the behavior of the function, and also provides means for a linear approximation for a non-linear function. Under the Taylor series expansion of F(x), the first derivative can be written as a product of a matrix and a vector $F'(x) = J^T e$, where J is the Jacobian of the error function e. The second derivative can be expressed as $F''(x) = J^T J$. At the minimum x*, $F'(x^*) = 0$ and $F''(x^*)$ is positive definite. Iterative techniques to solve for minimal x* can be expressed in the form of Ax=b, where $A = J^T J$, and x and b may be vectors.

Functionally, the optimizer may compute its estimations by linearizing the non-linear model function by constructing a $J^T J$ matrix in linearizer block 612. The $J^T J$ matrix can be a large matrix (e.g., on the order of 10,000 by 10,000 elements) because of the large number of feature points and motion data parameters. However, performing matrix multiplication on such large matrices can be impractical. Fortunately, the constructed $J^T J$ matrix is a highly sparse tridiagonal matrix. Taking advantage of the high sparsity, the $J^TJ$ matrix can be reduced down to a smaller matrix S having a more manageable size (e.g., on the order of 500 by 500 elements) in reducer block 614. The error minimization problem can then be represented as $S\Delta x=g$, which yields $\Delta x=S^{-1}g$.

To solve for the minimum error, the linear equation $Ax=b$ can be expressed in matrix notation as:

$$\begin{bmatrix} U & W \\ W^T & V \end{bmatrix} \begin{bmatrix} x_1 \\ x_2 \end{bmatrix} = \begin{bmatrix} b_1 \\ b_2 \end{bmatrix},$$

which deduces down to solving:

$$Ux_1+Wx_2=b_1,$$

$$W^Tx_1+Vx_2=b_2.$$

Applying this to the error minimization of the reduced matrix S yields:

$$S=U-W^TV^{-1}W,$$

$$g=b_1-V^{-1}Wb_2.$$

While performing these matrix operations on matrices having a size in the order of 500 by 500 elements may still seem daunting, the operations can be performed on subarrays of the full matrix, and the intermediate results can be stitched back together to obtain the desired results. These matrix operations can be performed on subarrays of sizes, for example, in the order of 4×4, 8×8, 16×16, 4×16, 16×4, etc. by solver block 616. The results from solver block 616 are then provided to updater block 618 to update the new estimations of position, rotation relative to a global reference frame, speed, etc., and the new estimations are fed back into the linearizer 612 for continuous processing as the device moves around.

Figure 7:
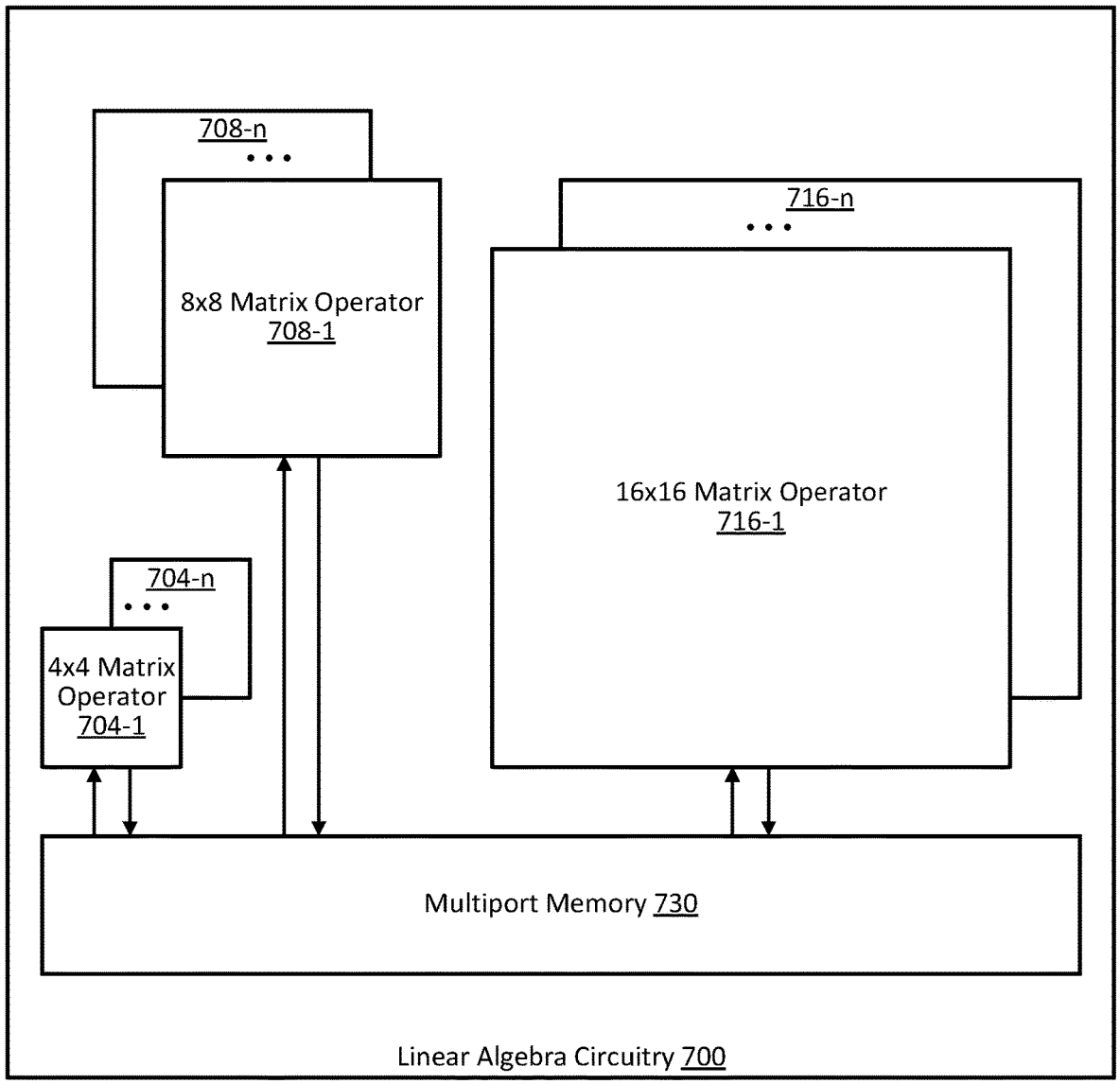
FIG. 7 illustrates a hardware block diagram of an example linear algebra engine that can be implemented in a sensory perception accelerator.

FIG. 7 illustrates a hardware block diagram of an example of linear algebra circuitry 700 that can be implemented in a linear algebra engine. The linear algebra engine may also be referred to as a linear algebra accelerator. Linear algebra circuitry 700 may include multiple matrix computation circuits that can perform matrix operations in parallel to speed up matrix computations such as those discussed above with reference to FIG. 6. Linear algebra circuitry 700 may also include a multiport memory 730 (e.g., can be implemented as a TCM) to provide input data to the matrix computation circuits, and to store the results of the matrix computations. In some implementations, linear algebra circuitry 700 may also include a local processor (not shown) to manage the data transfer of linear algebra circuitry 700.

By way of example, the matrix computation circuits may include a number of 4×4 matrix operators 704-1 to 704-n that can operate on 4×4 matrices, a number of 8×8 matrix operators 708-1 to 708-n that can operate on 8×8 matrices, and a number of 16×16 matrix operators 716-1 to 716-n that can operate on 16×16 matrices. It should be understood that the number of the different sized matrix operators need not be the same, and that other implementations may include matrix operators for other matrix sizes and/or omit certain matrix operators shown in FIG. 7.

At first glance, it may appear that the matrix computation circuits may perform a similar function as a systolic array or a vector dot product calculation engine (e.g., to perform matrix multiplication operations). However, at the atomic level, a matrix multiplication operation is implemented in a systolic array/vector dot product calculation engine as a vector operation. For example, when a feature map matrix is being multiplied with a weight matrix in a systolic array, a column of the feature map matrix is shifted through the array one cycle at a time to perform the multiplication. Thus, at the atomic level, the matrix multiplication in a systolic array can be represented as a series of vector multiplication. In contrast to a systolic array/vector dot product calculation engine, the matrix computation circuits in linear algebra engine circuitry 700 implements matrix operations at the atomic level.

By way of example, the 4×4 matrix operator 704-1 may perform a matrix multiplication operation by multiplying a 4×4 matrix with a 4×4 matrix. The multiplication result is a 4×4 matrix with 16 elements. In some implementations, to achieve matrix operation at the atomic level, the 4×4 matrix operator 704-1 may include 16 multiply-and-accumulate circuits, one for each of the 16 elements of the multiplication result. Each of the 16 multiply-and-accumulate circuits may include 4 multiplication circuits and 4 adder circuits to perform the dot product of two 4-element operands. In such implementations, a matrix multiplication operation can be completed in a single cycle. In other implementations, to reduce the amount of circuitry, the dot product computations can be pipelined to reuse the same circuitry for different elements of the matrices. Similar approaches can be implemented for the matrix operators of other sizes.

In some implementations, each of the matrix computation circuits can be programmable to selectively perform different matrix operations such as switching between perform matrix multiplication to matrix addition. In other implementations, the matrix computation circuits may include matrix operators dedicated for a particular operation. For example, the set of 4×4 matrix operators 704-1 may include a first subset of matrix operators dedicated for matrix addition (which includes matrix subtraction), and a second subset of matric operators dedicate for matrix multiplication, etc. Some matrix operators may also perform matrix-vector operations such as multiplying a matrix with a vector. In some implementations, the matrix computation circuits may also include matrix operators that operate on a single matrix operand to perform inversions and/or transpositions, etc.

In addition to matrix multiplication, addition, inversion, transposition, etc., linear algebra circuitry 700 can also perform more complex computations that may be useful in linear solving of dense matrices. Such complex operations may include performing a sequence of matrix operations to implement matrix square root, compute R matrix in QR decomposition of a rectangular matrix A (e.g., in which R is the upper triangular sub-matrix), compute LR decomposition of a square matrix A (e.g., in which L is lower triangular sub-matrix and R is upper triangular sub-matrix), etc. A hardware sequencer can perform an ordered sequence of matrix multiplication, matrix addition, and/or other matrix operations by writing the intermediate result from one matrix operator to multiport memory 730, reading back the intermediate result from multiport memory 730 as input to another matrix operator, and so forth. For example, a first matrix operator may perform a first matrix operation of the ordered sequence of matrix operations to generate an intermediate result and store the intermediate result in multiport memory 730, and a second matrix operator may receive the intermediate result from multiport memory 730 and perform a second matrix operation of the ordered sequence of matrix operations. In some implementations, the sequence of matrix operations for a complex computation can be implemented in a matrix operator.

By way of example, a sequence of operations for performing a QR decomposition will be described below. A matrix of dimension m rows and n columns can be stored in row or column major format, and the example below is given for a column major format:

For k=1:n
1. set the address to m*k+k (e.g., to access [k, k] element of A)
2. fetch the next m-k+1 elements (e.g., the last m-k+1 elements of kth column of matrix A) into vector y
3. update only the first element of this vector y[1] with y[1]+sign(y[1])‖y‖
4. construct unit vector by v=y/‖y‖
5. construct reflector matrix $H_k$ (m-k+1 by m-k+1) matrix I-2VV$^T$
6. use the appropriate matrix multiplication block (e.g., 4×4, 8×8, or 16×16, etc.) repeatedly as desired to compute matrix multiplication $H_k A_k$ where $A_k$ is the m-k+1 by n-k+1 sub matrix.

This yields the matrix A with the first n×n elements being the R matrix, and the remaining elements as 0 to achieve the matrix decomposition.

Figure 8:
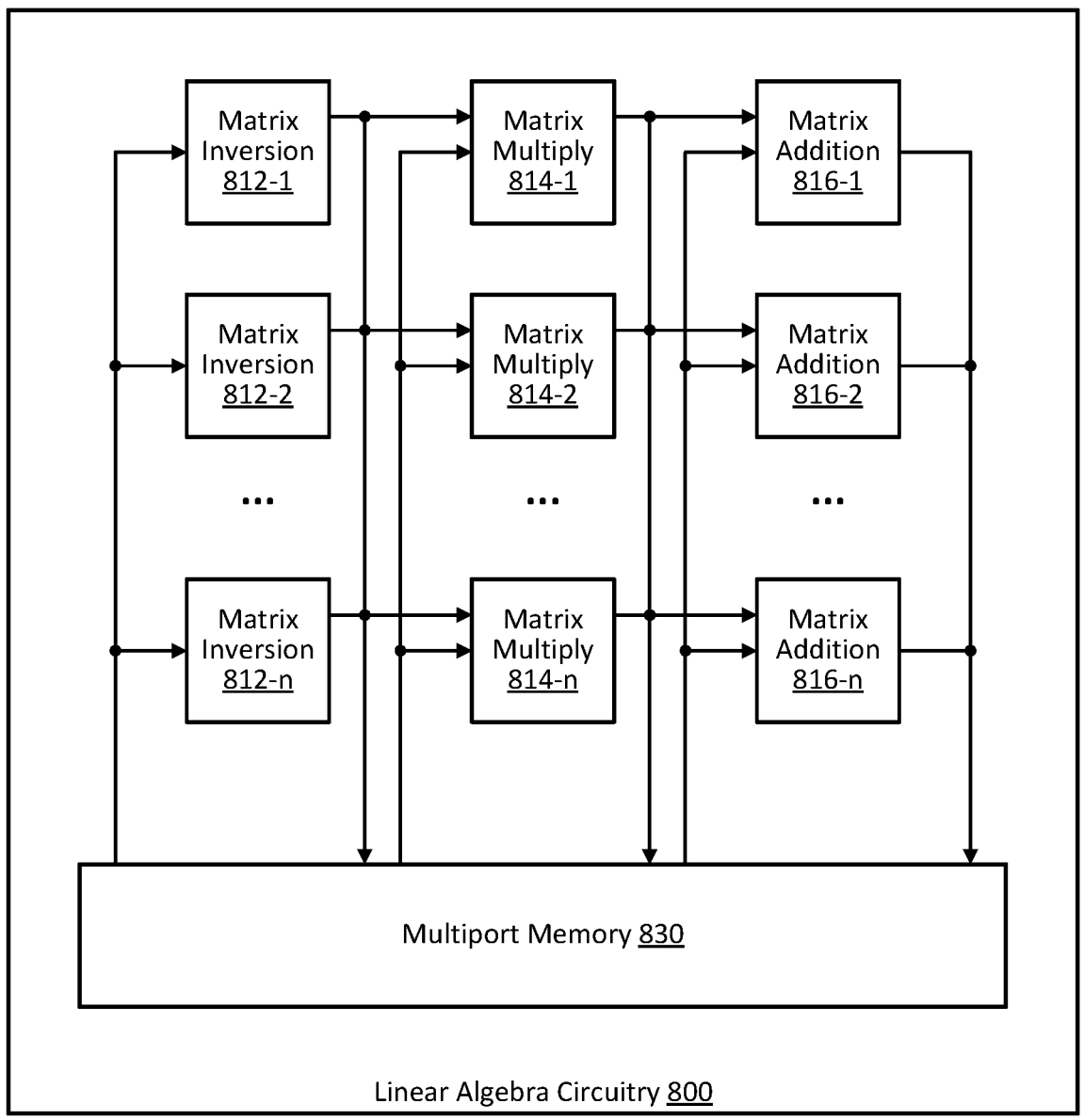
FIG. 8 illustrates a hardware block diagram of another example linear algebra engine that can be implemented in a sensory perception accelerator.

FIG. 8 illustrates a hardware block diagram of another example of linear algebra engine circuitry 800 that can be implemented in a linear algebra engine. Linear algebra engine circuitry 800 may include multiple matrix computation circuits that can perform matrix operations in parallel to speed up matrix computations such as those discussed above with reference to FIG. 6. Linear algebra engine circuitry 800 may also include a multiport memory 830 (e.g., can be implemented as a TCM) to provide input data to the matrix computation circuits, and to store the results of the matrix computations. In some implementations, linear algebra engine circuitry 800 may also include a local processor (not shown) to manage the data transfer of the linear algebra engine.

In the linear algebra engine described above with reference to FIG. 7, each matrix computation circuit receives input data from memory and writes the computational results back to the memory. Although low latency memories such as TCM can be used, accessing the memory will still incur some amount of latency. To further reduce the computation latency, linear algebra engine circuitry 800 includes additional enhancements to target the specific matrix computations of interest. Referring to the error minimization problem discussed above with reference to FIG. 6, the iterative matrix operations involved have a particular order of performing matrix inversion, then matrix multiplication, and followed by matrix addition (in the form of a matrix subtraction). Thus, to leverage the structured order of computations involved, linear algebra engine 800 may provide additional datapaths between the different matrix computation circuits to bypass having to write an intermediate result to multiport memory 830 and read back the intermediate result for the next stage of computations.

Referring to FIG. 8, linear algebra engine circuitry 800 may include multiple matrix computation circuits including a set of matrix inversion circuits 812-1 to 812-n, a set of matrix multiply circuits 814-1 to 814-n, and a set of matrix addition circuits 816-1 to 816-n. Although not specifically shown, the set of matrix inversion circuits 812-1 to 812-n may include matrix inversion circuits that operate on different matrix sizes, the set of matrix multiply circuits 814-1 to 814-n may include matrix multiply circuits that operate on different matrix sizes, and the set of matrix addition circuits 816-1 to 816-n may include matrix multiply circuits that operate on different matrix sizes.

Each of matrix inversion circuits 812-1 to 812-n may receive input data from multiport memory 830 and perform a matrix inversion operation on the input matrix. As shown in FIG. 8, the results of the matrix inversion are fed into matrix multiply circuits 814-1 to 814-n. Thus, the matrix multiply circuits 814-1 to 814-n may operate on the results of matrix inversion circuits 812-1 to 812-n without having to read the results from multiport memory 830. In some implementations, the inverted matrices can be written back to multiport memory 830 if the inversion results are needed for other computations.

Matrix multiply circuits 814-1 to 814-n may operate on the results of the matrix inversion circuits 812-1 to 812-n by multiplying the inversion results with input data read from multiport memory 830. In some implementations, the inversion results from matrix inversion circuits 812-1 to 812-n can also be multiplied with outputs from other matrix computation circuits. The results of the matrix multiply are fed into matrix addition circuits 816-1 to 816-n. Thus, the matrix addition circuits 814-1 to 814-n may operate on the results of matrix multiply circuits 812-1 to 812-n without having to read the results from multiport memory 830. In some implementations, the multiplication results can be written back to multiport memory 830 if the results are needed for other computations.

Matrix addition circuits 816-1 to 816-n may operate on the results of the matrix multiply circuits 814-1 to 814-n by adding or subtracting the multiplication results with input data read from multiport memory 830. In some implementations, the multiplication results from matrix multiply circuits 814-1 to 814-n can also be added to or subtracted from outputs from other matrix computation circuits. The results of matrix addition circuits 816-1 to 816-n can be stored in multiport memory 830 for use by the optimizer.

Although FIG. 8 illustrates three stages of matrix computations, it should be understood that other implementation may involve a different number of computational stages. Furthermore, the matrix computation circuits need not be a circuit dedicated for the specified operation. Any of the matrix computation circuits can be a programmable matrix operation circuit that can perform various matrix operations, but is specifically configured to perform the specified operation. In some implementations, linear algebra engine 800 may include a mixture of programmable matrix operation circuits and dedicated matrix operation circuits.

Figure 9:
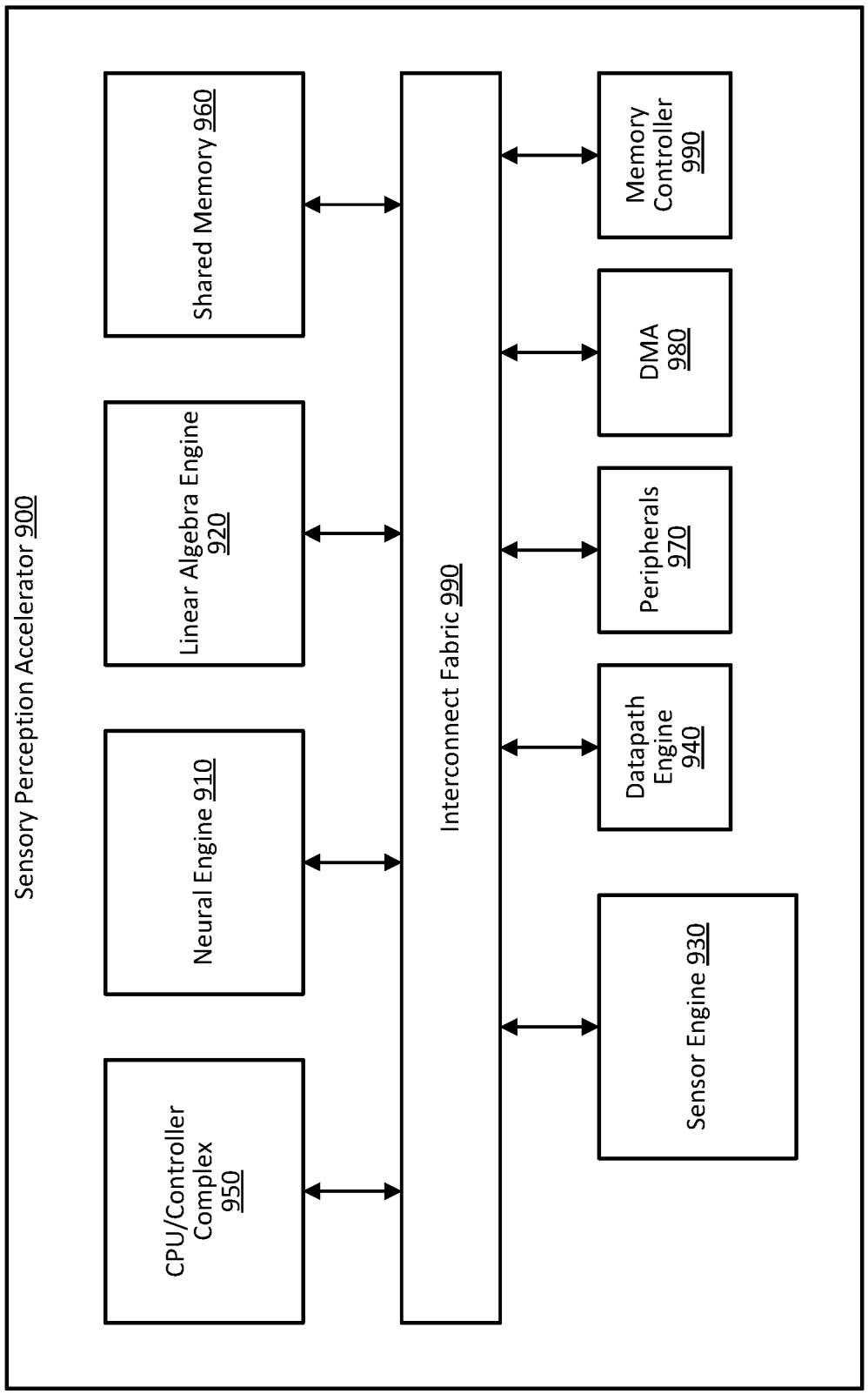
FIG. 9 illustrates a hardware block diagram of a sensory perception accelerator.

FIG. 9 illustrates a hardware block diagram of a sensory perception accelerator 900. Sensory perception accelerator 900 can be implemented as one or more integrated circuit devices. For example, the components of sensory perception accelerator 900 can be integrated on a single semiconductor die, or multiple semiconductor dies implementing the components can be integrated in a single module or semiconductor chip package. Various components of sensory perception accelerator 900 have been described above, and a detailed description of which need not be repeated.

Sensory perception accelerator 900 may include a neural engine 910, a linear algebra engine 920, and a sensor engine 930. These components can be implemented as any of the various embodiments describe above. Neural engine 910, linear algebra engine 920, and sensor engine 930 can be coupled with each other and other components of sensory perception accelerator 900 via an interconnect fabric 990. Examples of interconnect fabric 990 may include multilayer fabrics such as Advanced eXtensible Interface (AXI) interconnect fabric that can provide high bandwidth data transfer between the various components.

Sensory perception accelerator 900 may include a CPU complex 950. CPU complex 950 may include one or more processor cores to manage the interactions and data transfer of the various components of sensory perception accelerator 900. In implementations having more than one processor core, CPU complex 950 may include a shared L3 cache. In some implementations, CPU complex 950 may perform higher level processing such as path planning and other higher level visual perception operations. CPU complex 950 may also perform motor control, or a separate processor can be used for such functions.

Sensory perception accelerator 900 may include a shared memory 960 coupled to interconnect fabric 990. Shared memory 960 can be implemented using SRAM, DRAM, flash, and/or other suitable embedded memory technologies. Shared memory 960 can be used to enhance the memory capacity of any of the components of sensory perception accelerator 900. In some implementations, shared memory 960 can be used to store large datasets such as a 3D map of a device's surroundings once the device has learned its environment. Shared memory 960 can also be used to store neural network models that are not currently in use by neural engine 910, and the neural network models can be loaded into neural engine 910 when needed to improved offline functionality.

To further enhance memory and storage capabilities, sensory perception accelerator 900 may also include a direct memory access (DMA) unit 980 and a memory controller 990. DMA unit 980 can provide direct memory access to the components of sensory perception accelerator 900 such that memory reads and writes to and from the components can bypass CPU complex 950 to reduce latency. Memory controller 990 may provide an interface to couple sensory perception accelerator 800 to an external memory such as an external DRAM module, high bandwidth memory (HBM) module, or other suitable memory technologies to further increase the memory storage capacity of sensory perception accelerator 900.

Sensory perception accelerator 900 may also include a datapath engine 940 and peripherals 970. Datapath engine 940 may perform data encryption/decryption to enhance data privacy, as well as data compression/decompression to more effectively store and transfer data. Peripherals 970 may include one or more of various interface and connectivity technologies such as universal serial bus (USB), inter-integrated circuit (I2C), peripheral component interconnect express (PCIe), serial peripheral interface (SPI), camera serial interface (CSI), inter-IC sound (I2S), as well as peripheral components such as a timer, general purpose input/outputs (GPIOs), etc.

The specification and drawings are to be regarded in an illustrative rather than a restrictive sense. It will, however, be evident that various modifications and changes may be made thereunto without departing from the broader spirit and scope of the disclosure as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
    sensor engine circuitry configured to:
        receive first sensor data from one or more microphones, second sensor data from one or more cameras, and third sensor data from one or more motion sensors;
        determine audio data from the first sensor data;
        determine image data from the second sensor data; and
        determine motion data from the third sensor data;
    neural engine circuitry having a plurality of systolic arrays operable to execute a plurality of neural networks in parallel, the neural engine circuitry configured to:
        receive the image data and the audio data from the sensor engine circuitry;
        perform detection and recognition of objects in a system's environment based on the image data; and
        perform audio detection and recognition of sounds in the system's environment based on the audio data; and
    a positioning and mapping engine including linear algebra circuitry having a plurality of matrix computation circuits, the linear algebra circuitry configured to:
        receive the image data and the motion data from the sensor engine circuitry; and
        generate position and 3D mapping information of the system's environment based on the image data and the motion data by performing matrix operations in parallel using the plurality of matrix computation circuits.

2. The system of claim 1, wherein the plurality of matrix computation circuits includes a first plurality of matrix inversion circuits, a second plurality of matrix multiplication circuits, and a third plurality of matrix addition circuits.

3. The system of claim 1, wherein the plurality of matrix computation circuits includes:
    a first set of matrix multiplication circuits configured to perform matrix multiplication on matrices having a first size; and
    a second set of matrix multiplication circuits configured to perform matrix multiplication on matrices having a second size that is different from the first size.

4. A data processing device comprising:
    a neural network accelerator having a plurality of neural network computation circuits operable to concurrently execute a first neural network on a first type of input data and a second neural network on a second type of input data; and
    a linear algebra accelerator having a plurality of matrix computation circuits operable to perform matrix operations on the first type of input data and a third type of input data,
    wherein the linear algebra accelerator and the neural network accelerator are configured to concurrently operate on the first type of input data.

5. The data processing device of claim 4, wherein the plurality of neural network computation circuits include systolic arrays of different sizes, or vector dot product computation engines of different sizes.

6. The data processing device of claim 4, wherein the plurality of neural network computation circuits include systolic arrays that are coupled to a multiport memory configured to provide a same set of feature map input elements to at least two systolic arrays.

7. The data processing device of claim 6, wherein the systolic arrays are configured to generate partial sums that are stored back in the multiport memory.

8. The data processing device of claim 4, wherein the plurality of matrix computation circuits includes matrix computation circuits that operate on different matrix sizes.

9. The data processing device of claim 4, wherein the first type of input data is image data, the second type of input data is audio data, and the third type of input data is motion data.

10. The data processing device of claim 4, wherein the matrix operations include performing a sequence of matrix operations.

11. The data processing device of claim 10, wherein the linear algebra accelerator includes a multiport memory, and the plurality of matrix computation circuits includes:
    a first matrix computation circuit configured to perform a first matrix operation of the sequence of matrix operations to generate an intermediate result and store the intermediate result in the multiport memory; and a second matrix computation circuit configured to receive the intermediate result from the multiport memory and perform a second matrix operation of the sequence of matrix operations.

12. The data processing device of claim 10, wherein the sequence of matrix operations implements a matrix decomposition.

13. An integrated circuit device comprising:
a linear algebra accelerator having a plurality of matrix computation circuits, the plurality of matrix computation circuits including:
   a first set of matrix computation circuits configured to perform a first matrix operation to generate first output values;
   a second set of matrix computation circuits configured to perform a second matrix operation on the first output values to generate second output values; and
   a third set of matrix computation circuits configured to perform a third matrix operation on the second output values to generate third output values; and
a neural network accelerator having a plurality of systolic arrays,
wherein the plurality of systolic arrays includes a first systolic array to perform computations on a first weight matrix of a first size and a second systolic array to perform computations on a second weight matrix of a second size that is different from the first size.

14. The integrated circuit device of claim 13, wherein the first matrix operation is a matrix inversion operation.

15. The integrated circuit device of claim 13, wherein the second matrix operation is a matrix multiplication operation.

16. The integrated circuit device of claim 13, wherein the third matrix operation is a matrix addition operation.

17. The integrated circuit device of claim 13, wherein the plurality of matrix computation circuits includes:
   a first matrix computation circuit configured to perform matrix multiplication on a matrix having a first size; and
   a second matrix multiplication circuit configured to perform matrix multiplication on a matrix having a second size that is different from the first size.

18. The integrated circuit device of claim 13, wherein the plurality of systolic arrays configured to execute a plurality of neural networks concurrently.

* * * * *